July 23, 1957 G. H. TOWNER 2,800,586
ARTIFICIAL INDUCTOR
Filed July 31, 1953 2 Sheets-Sheet 1
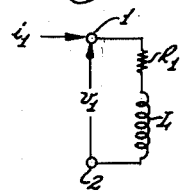
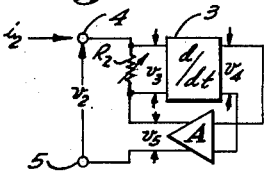
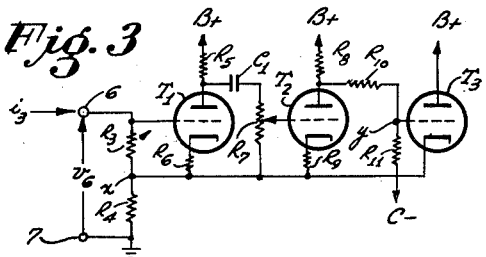
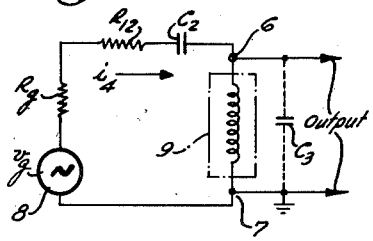
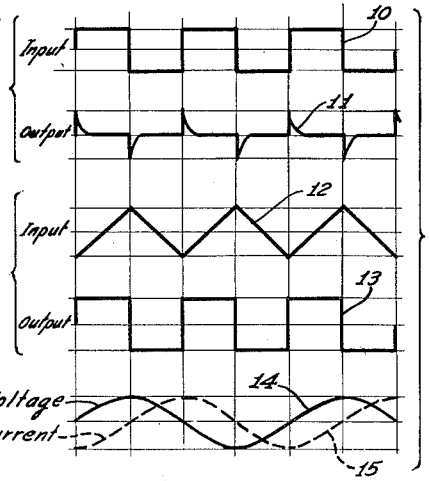
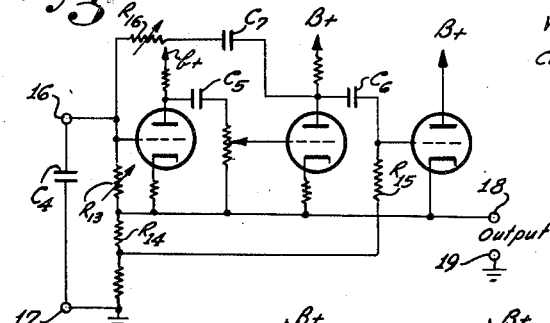
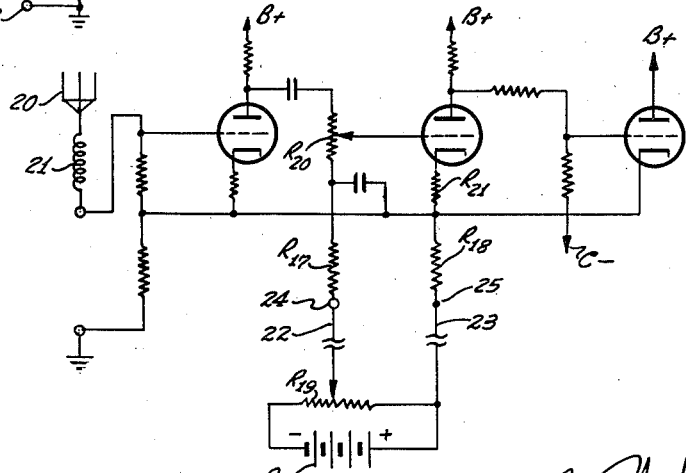
INVENTOR:
George H. Towner
By Herbert E. Metcalf
His Patent Attorney United States Patent Office 2,800,586
Patented July 23, 1957

2,800,586

ARTIFICIAL INDUCTOR

George H. Towner, San Diego, Calif., assignor to Northrop Aircraft, Inc., Hawthorne, Calif., a corporation of California Application July 31, 1953, Serial No. 371,624

15 Claims. (Cl. 250—36)

This invention relates generally to inductors and more particularly to means for creating an artificial inductor having a large inductance and relatively small physical size.

The amount of inductance obtainable in a coil depends upon the number of flux linkages connecting with conductor turns. Increasing the number of turns will increase the inductance, and also the inductor resistance. The flux can be increased greatly by providing a coil with a high permeability core without increasing inductor resistance, but permeability varies with field strength in high permeability materials. Complications arising from this effect restrict their use in radio frequency circuits. In short air core coils, the inductance of a single turn 10 centimeters in diameter (of relatively small diameter wire) is about 0.3 microhenry. The inductance of such short, space-wound coils is approximately proportional to the turn diameter and to the square of the number of turns. Thus, a coil 20 centimeters in diameter, in order to have an inductance of one henry, must require roughly 1,300 coincident turns. Large inductance air core coils will obviously need prohibitively large spaces to accommodate them.

It is an object of this invention to provide means for an artificial inductor of large inductance and small physical size without the use of inductance coils.

Another object of this invention is to provide artificial inductor means suitable for use in an oscillator or in a high Q resonant circuit.

Another object of the invention is to provide inductance means which can be remotely varied by simple control means connected by lengths of ordinary unshielded lines.

A further object of the invention is to provide effective tone control means utilizing an artificial inductor.

Briefly, the foregoing and other objects are preferably accomplished by providing an adjustable resistance, a differentiating network having the input connected across the resistance, an amplifier means connected at its input to the output of the differentiating network. The output of the amplifier means is connected in series with the resistance for an artificial inductor as viewed at the extremities of this series combination. Components of the artificial inductor are selected which follow linear relationships and the sequence of component hookup can thus be varied or component elements can be distributed. Regenerative or inverse feed-back can be employed in the circuit to advantage. The invention can be made easily to function in an oscillator or tone control channel.

The invention will be more fully understood by reference to the accompanying drawings, in which:

Figure 1 is a symbolic diagram of an air core inductor.

Figure 2 is a schematic block diagram of an artificial inductor, according to the present invention.

Figure 3 is a detailed wiring diagram for the schematic block diagram of Figure 2.

Figure 4 is a wiring diagram showing a test circuit for determining the behavior of an artificial inductor to different input signals.

Figure 5 is a drawing showing various waveforms of different input signals applied to an artificial inductor and the resulting waveforms derived across the inductor.

Figure 6 is a circuit diagram of an oscillator utilizing an artificial inductor.

Figure 7 is a wiring diagram illustrating an artificial inductor used for tuning an antenna, the inductance being remotely controlled.

Figure 8:
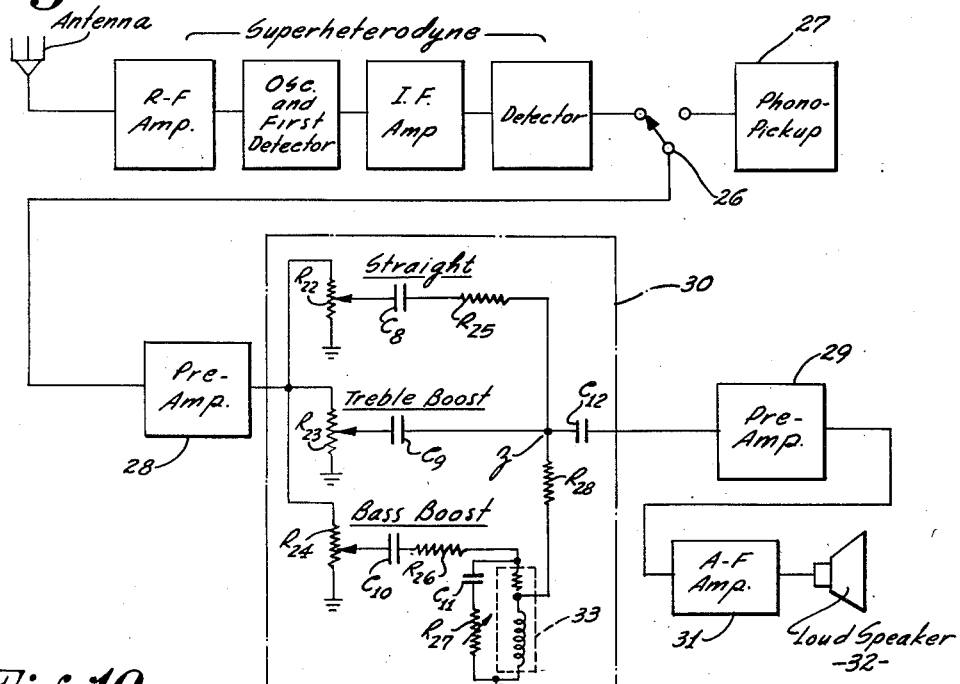
Figure 8 is a single-line diagram of a radio and phonograph system wherein tone control is provided which employs an artificial inductor in a bass boost channel.

Referring first to Figure 1, there is shown a symbolic diagram of an air core inductor. A resistance $R_1$ representing the inherent resistance of an inductance $L$ is shown lumped together before the inductance element $L$. A current $i_1$ will flow around the circuit when voltage $v_1$ is applied to terminals 1 and 2. By Kirchhoff's voltage law $$v_1 = R_1 i_1 + L \frac{di_1}{dt} \qquad \text{(Eq. 1)}$$

In Figure 2, a schematic circuit diagram for an artificial inductor constructed in accordance with this invention is shown. A resistance $R_2$, which can be adjustable, is connected in series with the output of an amplifier A. The input of a differentiating network 3 is connected across resistance $R_2$ as shown, and the output of differentiating network 3 is connected to the input of amplifier A. When a voltage $v_2$ is applied between terminals 4 and 5, a current $i_2$ will flow into the network. Current $i_2$ is the loop current which flows, say, in at terminal 4 and out of terminal 5. A negligible portion of $i_2$ is assumed to branch into the differentiating network 3 (or amplifier A, since component sequence can be changed). This is a reasonable assumption because proper selection of component values (or correct amplifier operation wherein negligible grid current flows) can assure this condition. It is also desirable from the view point that loop current $i_2$ is the current through an inductance and should not be required to drive or energize other elements. Other voltages will develop in the circuit, such as $v_3$ across resistance $R_2$ (and input to the differentiating network 3), $v_4$ across the output of network 3 (and input to amplifier A) and $v_5$ across the output of amplifier A. Examination of Figure 2 will establish the following relationships.

$$v_3 = R_2 i_2$$

$$v_4 = \frac{dv_3}{dt} = \frac{d(R_2 i_2)}{dt} = R_2 \frac{di_2}{dt}$$

$$v_5 = A v_4 = A R_2 \frac{di_2}{dt}$$

$$v_2 = v_3 + v_5 = R_2 i_2 + A R_2 \frac{di_2}{dt} \qquad \text{(Eq. 2)}$$

From this result, it can then be observed by comparison with Eq. 1 that the quantity $AR_2$ corresponds to the quantity $L$ and $R_2$ corresponds to $R_1$. Further, since the two differential equations (Eq. 1 and Eq. 2) defining the two networks are essentially the same, the two networks themselves are identically equivalent and will behave in like manner within the range of circuit parameter consistency.

The schematic block diagram of Figure 2 is shown in detail in Figure 3 for a preferred construction of the invention. Terminals 6 and 7 are the two ends of an artificial inductor which is composed of resistance and capacitance elements, and three tubes as amplifier stages, for example. An adjustable resistance $R_3$ is connected at one end to terminal 6, and a series resistance $R_4$ is connected between the other end of resistance $R_3$ and terminal 7 as shown. Resistance $R_3$ is adjustable from 0 to 10 kilohms, for example, and a typical value for $R_4$ is 27 kilohms. The control grid of tube $T_1$ is directly connected to terminal 6. A load resistance $R_5$ of 100 kilohms, for example, is connected to the plate of tube $T_1$ and to a B+ voltage supply. Resistance $R_6$ (1.8 kilohms, for example) connects with the cathode of tube $T_1$ and to the junction point $x$ of resistances $R_3$ and $R_4$.

One end of a capacitance $C_1$ (.001 mfd.) is connected to the plate of tube $T_1$ and a series resistance $R_7$ (2.5 megohms) is connected to the other end of capacitance $C_1$ and to the junction point $x$, as shown. These two elements, $C_1$ and $R_7$, comprise an R-C differentiator, the output of which is an adjustable tap on resistance $R_7$ connected directly to the control grid of tube $T_2$. Load resistance $R_8$ (100 kilohms) is connected to the plate of tube $T_2$ and to a B+ supply. Resistance $R_9$ (1.8 kilohms) connects with the cathode of tube $T_2$ and to the junction point of resistances $R_3$ and $R_4$.

A resistance $R_{10}$ is connected to the plate of tube $T_2$ and series resistance $R_{11}$ is connected to $R_{10}$ at one end and to C— bias supply at the other. The grid of tube $T_3$ is connected to the junction point $y$ between resistances $R_{10}$ and $R_{11}$. The plate of tube $T_3$ is directly connected to B+ and the cathode is directly connected to the junction point $x$, thus forming a cathode follower stage where the output voltage is developed across resistance $R_4$.

A voltage $v_6$ can be impressed across terminals 6 and 7. A current $i_s$ which flows is that resulting from voltage $v_6$ "seeing" an inductor between terminals 6 and 7, having an equivalent inductor resistance of essentially $R_3$ ($R_4$ and $T_3$ cathode impedance in parallel is low). The inductance can be varied by increasing or decreasing $R_3$ or $R_7$ (tap). Variation of $R_3$ is preferable because decreasing this resistance decreases the apparent inductance between terminals 6 and 7 which simulates an actual inductor in respect to inherent inductor resistance.

To show that the invention behaves as a true inductor, a signal generator 8 having an internal impedance $R_g$ and an open circuit output voltage $v_g$ can be connected across terminals 6 and 7. This connection is illustrated in Figure 4 wherein 9 represents the artificial inductor and $R_g$ represents the internal generator impedance. The signal generator 8 is connected to artificial inductor 9 through a resistance $R_{12}$ (3 megohms, for example) and a series capacitance $C_2$ (1 mfd., for example), as shown. These two elements are utilized only for test purposes, the capacitance $C_2$ blocking out any D. C. and the high resistance $R_{12}$ for maintaining current constant. If the signal generator 8 has a high internal impedance, the resistance $R_{12}$ can be omitted.

An oscilloscope (not shown) can be connected across artificial inductor 9 to view the output waveform. Referring to Figure 5, when a square wave voltage input 10 is applied to inductor 9, the voltage output is observed to be a spike wave 11. When signal generator 8 impresses a triangular wave 12 across artificial inductor 9, the output is seen to be a square wave 13. A sine wave input yields a sine wave output 14. Current $i_4$ flowing in the circuit in this instance is also a sine wave 15 which, however, lags by a 90 degree phase angle. Now, by connecting a capacitance $C_3$ (.01 mfd., for example) across the inductor 9 as indicated in Figure 4, a resonant frequency tank circuit is produced. With the resonant circuit, a sine wave output is produced irrespective of a square or triangular wave input such as before.

It follows, then, that the artificial inductor circuit should be susceptible of easy modification for operation as an oscillator. Figure 6 shows a circuit diagram of such an oscillator, or that of a high Q resonant circuit. A 5 to 1 frequency change is available with the example shown in Figure 6. The oscillator circuit there shown is an exceptionally good low frequency oscillator capable of generating a particularly good sine waveform for frequencies actually achieved of as low as 0.1 C. P. S. Further, the output is a constant sine wave wherein frequency change over a wide range does not affect amplitude.

In Figure 6, capacitance $C_4$ is connected across terminals 16 and 17 to form a resonant tank with an artificial inductor. This capacitance $C_4$ is .01 mfd., for example. Resistance $R_{13}$ (0 to 10 kilohms, for example) can be used as the tuning means, connected across the input of the amplifier, and a resistance $R_{14}$ (1 kilohm, for example) has been added to provide the C— bias previously secured by a battery. Capacitance $C_5$ (.1 mfd., for example) has been employed simply for unity coupling, the differentiating network being located between the second and third tubes in this figure. Capacitance $C_6$ (.001 mfd.) and series resistance $R_{15}$ (2.2 megohms) comprise the differentiator and is connected as shown. It should be noted here that the artificial inductor circuit configuration is not necessarily limited to location sequence of components because the defining network equations assume and are valid for linear relationships, that is, the order is of no consequence on the net or end results. The differentiating circuit can be placed in the grid circuit of any of the three tubes (amplifier stages), for example.

A positive feedback loop is connected from the plate of the second tube back to the grid of the first tube. The loop is comprised of a resistance $R_{16}$ (variable from 100 kilohms to 5 megohms) connected in series with a capacitance $C_7$ (.1 mfd.). The positive feedback is controlled as to amount and phase by the resistance $R_{16}$ and capacitance $C_7$ blocks out any D. C. from this feedback. The output is derived from the cathode follower (last tube) across terminals 18 and 19.

Capacitance $C_4$ can be omitted in Figure 6 to yield a "perfect" inductor (one having virtually no resistance) when the correct amount of positive feedback is provided back to terminal 16 since the feedback voltage cancels the original voltage across resistance $R_{13}$.

A good use for the circuit of Figure 3 can be that illustrated in Figure 7. Here, the artificial inductor is used as an antenna tuning inductance for antenna 20. Coil 21 is used for top loading the antenna. In an antenna tuning circuit, the tuning inductance is desirably located near the antenna in order to eliminate the need for a long, shielded lead-in line from the antenna to where manual adjustment is performed. In Figure 7, the tuning inductance can be varied by changing the tap position of resistance $R_{19}$ which is connected across bias battery P. Resistance $R_{19}$ and battery P are located remotely from the artificial inductor circuit. Leads 22 and 23 connect to respective terminals 24 and 25 to which are connected one end each of large isolating resistances $R_{17}$ and $R_{18}$ of which the other end of resistance $R_{17}$ is connected to differentiator resistance $R_{20}$ while the other end of resistance $R_{18}$ is connected to cathode resistance $R_{21}$, as shown. The long leads 22 and 23 do not have to be shielded because their capacity cannot affect the tuning inductance (an artificial inductor). For the purpose of remote control, as in the example shown, remote cutoff pentodes such as type 6BA6, 6K7 or 6SK7 are preferable although triodes as type 12AU7 are fully satisfactory.

A large and linear inductance element having a small physical size is highly desirable and has a strong demand in a variety of different uses. Figure 8 shows a single-line diagram of a radio and phonograph (or wire recorder, etc.) system wherein an artificial inductor is effectively employed in tone control. A block diagram of the usual super-heterodyne receiver is shown. A single pole, two position switch 26 has been provided whereby either radio or phonograph 27 can be selected for operation. In addition to this minor change, two one-tube preamplifiers 28 and 29 can be inserted just before and after tone control unit 30. The output of amplifier 29 is fed to audio frequency amplifier 31 which drives a loud speaker 32 (12 inch speaker, for example).

The audio equalizer, or tone control 30 is divided into three channels which have been labeled as straight, treble boost and bass boost. These channels have adjustable resistance (500 kilohms, for example) input potentiometers $R_{22}$, $R_{23}$, and $R_{24}$, respectively. The tap of resistance $R_{22}$ is connectd to a capacitance $C_8$ (.1 mfd., for example) and a series resistance $R_{25}$ (1 megohm, for example) which is connected to a junction point $z$. The tap of resistance $R_{23}$ is also connected to junction point $z$ through a capacitance $C_9$ (of 100 mmfd.) for example. The tap of resistance $R_{24}$ is connected directly to a capacitance $C_{10}$ (.1 mfd., for example) which is connected to a series resistance $R_{26}$ (670 kilohms, for example). Resistance $R_{26}$, in turn, is connected to artificial inductor 33 across which is connected a capacitance $C_{11}$ (.01 mfd., for example) and adjustable series resistance $R_{27}$ (0 to 500 kilohms, for example) for a resonant circuit, as shown; $R_{27}$ being used to adjust and change the Q of the circuit. Resistance $R_{28}$ (100 kilohms, for example) is connected to a point on artificial inductor 33 and to the junction point $z$. The three channels are thus combined or added together by this junction point $z$. Capacitance $C_{12}$ (.1 mfd., for example) couples the total output to amplifier 29.

Figure 9:
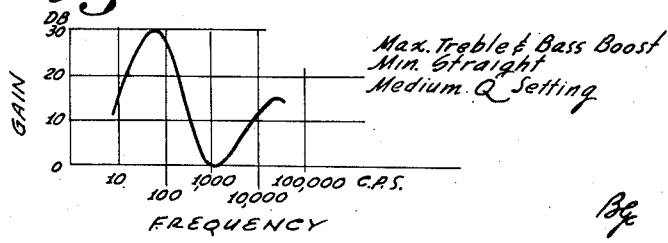
Figure 9 is a graph of frequency response of the system of Figure 8 due to certain settings of the tone control channels.

The effectiveness of the bass boost channel is shown in Figure 9 which is a graph of frequency response for maximum settings of the treble and bass boost channels. The straight channel output was set to a minimum and the Q adjustment (selectivity) was placed at medium setting. The curve of Figure 9 shows a pronounced peak of 30 decibels' gain at about 80 C. P. S. due to the bass boost channel. The curve drops to a straight line section (0 db gain) at about 1000 C. P. S. and then rises to another peak of 15 decibels at about 15,000 C. P. S. which is the result of the treble boost. The first peak (bass) can be sharpened or broadened by decreasing or increasing resistance $R_{27}$. The peak can also be shifted to a higher or lower frequency by varying the inductance of inductor 33. This can be done by varying the frequency (inductance) tuning resistance in the artificial inductor.

Figure 10:
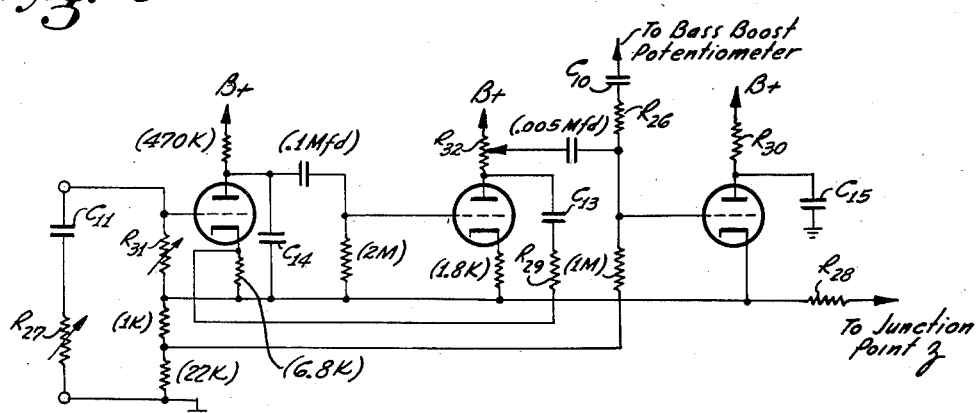
Figure 10 is a wiring diagram showing details of the artificial inductor as used in the circuit of Figure 8.

The bass boost channel has been shown in greater detail in Figure 10. The circuit of the artificial inductor is quite similar to that of Figure 6. Negative feedback, however, has been employed in Figure 10 since this circuit is not intended to be an oscillator although it can function as a good sine wave oscillator without the negative feedback. The inverse feedback was employed in the circuit of Figure 10 to cut down the gain and to stabilize the network. The feedback loop is comprised of capacitance $C_{13}$ (1 mfd.) and series resistance $R_{29}$ (270 kilohms) connecting the plate of the second tube (amplifier stage) and cathode of the first tube, as shown. Parasitic suppressor capacitance $C_{14}$ (.0015 mfd.) is connected between the plate of the first (or second) tube and the lower end of the cathode resistance of the tube. Another variation from the circuit of Figure 6 is the addition of a decoupling filter composed of resistance $R_{30}$ (47 kilohms) connected as a plate load resistance for the third tube, and a capacitance $C_{15}$ (20 mfd.) connected from the plate of the third tube to ground. All of the additional elements ($C_{13}$, $R_{29}$, $C_{14}$, $R_{30}$ and $C_{15}$) can be omitted from the circuit without unduly affecting the performance since they are actually refinement components.

Variation of frequency tuning resistance $R_{31}$ (0 to 20 kilohms), connected across the input of the first amplifier tube, can shift the first peak of the curve in Figure 9 laterally. The feedback (loop gain) for this circuit can be adjusted to that just short of oscillation by setting the tap of resistance $R_{32}$ (100 kilohms). Another point that can be mentioned is that the connection of $C_{10}$ and $R_{26}$ is preferably to the grid of the last tube and $R_{28}$ is preferably connected to the cathode of the last tube, which is the regular cathode follower output. The reason for this is that the impedances at these points are more properly matched for the circuit as shown. Resistance $R_{28}$ can be connected to the plate of the second tube if a higher output is desired and the bass boost will function just as well. The three tubes shown can each be a section of a type 12AX7 tube, for example. Other element values have been noted on the drawing for a preferred artificial inductor, including a .005 mfd. capacitor and 1 megohm resistor for the differentiating network.

The basic artificial inductor circuit (Figure 3) is thus capable of producing a large effective inductance which is useful for many different purposes. An inductance of 10,000 henrys has been easily obtained with this circuit. The frequency range, however, was limited from 0 to about 500 C. P. S. for the circuit shown in Figure 10, although the upper limit can be raised indefinitely by proper choice of components and the values thereof. The invention is useful as an extremely good sine wave oscillator, especially in the very low frequency range, or as a tunable highly selective bandpass filter.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An artificial inductor, comprising: resistance means; amplifier means having an input and an output, said resistance means connected in series with the output of said amplifier means; and differentiating means having an input and an output, the input of said differentiating means connected across said resistance means and the output of said differentiating means connected to the input of said amplifier means, whereby an inductance is provided between the ends of the combination of said resistance means connected in series with the output of said amplifier means.

2. Apparatus in accordance with claim 1 wherein said resistance means is adjustable to vary the effective inductance of said artificial inductor.

3. An artificial inductor, comprising: a resistance; a first amplifier stage having an input and an output, the input of said first amplifier stage connected across said resistance; a differentiating network having an input and an output, the input of said differentiating network connected to the output of said first amplifier stage; a second amplifier stage having an input and an output, the input of said second amplifier stage connected to the output of said differentiating network; a third amplifier stage having an input and an output, the input of said third amplifier stage connected to the output of said second amplifier stage, and the output of said third amplifier stage connected in series with said resistance, whereby an inductance is provided between the ends of the combination of said resistance and series output of said third amplifier stage.

4. Apparatus in accordance with claim 3 wherein said resistance is adjustable whereby the effective inductance of said artificial inductor is changed by varying said resistance.

5. Apparatus in accordance with claim 3 wherein said differentiating network is a capacitance and series resistance combination connected across the output of said first amplifier stage, the output of said differentiating network being taken across the series resistance of said differentiating network.

6. Apparatus in accordance with claim 3 wherein said third amplifier stage is a cathode follower.

7. Apparatus in accordance with claim 3 including means for adjusting the bias of said second amplifier stage whereby the effective inductance of said artificial inductor is changed by varying said bias.

8. An oscillator, comprising: a resistance; connecting means; differentiating means having an input and an output, the input of said differentiating means connected across said resistance by said connecting means; amplifier means having an input and an output, the input of said amplifier means being connected to the output of said differentiating means, and the output of said amplifier means connected in series with said resistance; a capacitance connected between the ends of the series combination of said resistance and series output of said amplifier means; and means further connecting with the output of said amplifier means for an external output.

9. Apparatus in accordance with claim 8 wherein said resistance is adjustable whereby the output frequency of said oscillator is changed by varying said resistance.

10. An oscillator, comprising: a resistance; a first amplifier stage having an input and an output, the input of said first amplifier stage connected across said resistance; a second amplifier stage having an input and an output, the input of said second amplifier stage connected to the output of said first amplifier stage; a differentiating network having an input and an output, the input of said differentiating network connected to the output of said second amplifier stage; a third amplifier stage having an input and an output, the input of said third amplifier stage connected to the output of said differentiating network, and the output of said third amplifier stage connected in series with said resistance; a capacitance connected between the free ends of the series combination of said resistance and series output of said third amplifier stage; and means further connecting with the output of said third amplifier stage for an external output.

11. Apparatus in accordance with claim 10 wherein said third amplifier stage is a cathode follower.

12. Apparatus in accordance with claim 10 including feedback means connecting the output of said second amplifier stage and the input of said first amplifier stage for positive feedback.

13. Apparatus in accordance with claim 12 wherein said feedback means include an adjustable resistance and series capacitance, said latter resistance being adjustable to control the amount of feedback.

14. An electrical circuit including inductance means, said inductance means comprising a first and a second connection point into said circuit, a resistance having one end connected to said first connection point, differentiating means having an input and an output, means connecting the input of said differentiating means across said resistance, amplifier means having an input circuit and two output terminals, the output of said differentiating means connected to the input circuit of said amplifier, one of said amplifier output terminals connected to the other end of said resistance, and the other output terminal connected to said second connection point.

15. Apparatus in accordance with claim 14 wherein said amplifier means includes a cathode follower output stage having the cathode resistor thereof connected in series with said resistance.

References Cited in the file of this patent

UNITED STATES PATENTS

| | | |
|---|---|---|
| 2,321,269 | Artzt | June 8, 1943 |
| 2,386,892 | Hadfield | Oct. 16, 1945 |
| 2,422,424 | Landon | June 17, 1947 |
| 2,441,567 | Darlington | May 18, 1948 |
| 2,445,508 | Beleskas | July 20, 1948 |
| 2,463,073 | Webb | Mar. 1, 1949 |
| 2,503,046 | Hills | Apr. 4, 1950 |
| 2,506,329 | Ames | May 2, 1950 |
| 2,510,787 | Wheeler | June 6, 1950 |
| 2,521,694 | Crosby | Sept. 12, 1950 |